US006962200B2

(12) United States Patent
Nguyen et al.

(10) Patent No.: US 6,962,200 B2
(45) Date of Patent: *Nov. 8, 2005

(54) METHODS AND COMPOSITIONS FOR CONSOLIDATING PROPPANT IN SUBTERRANEAN FRACTURES

(75) Inventors: Philip D. Nguyen, Duncan, OK (US); Johnny A. Barton, Marlow, OK (US); O. Marlene Isenberg, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/407,643

(22) Filed: Apr. 4, 2003

(65) Prior Publication Data

US 2003/0188872 A1 Oct. 9, 2003

Related U.S. Application Data

(63) Continuation-in-part of application No. 10/041,142, filed on Jan. 8, 2002, now Pat. No. 6,668,926, and a continuation-in-part of application No. 10/163,185, filed on Jun. 4, 2002, now abandoned, and a continuation-in-part of application No. 10/183,200, filed on Jun. 26, 2002, now Pat. No. 6,729,404, and a continuation-in-part of application No. 10/260,888, filed on Sep. 30, 2002, now Pat. No. 6,725,931.

(51) Int. Cl.$^7$ .............................................. E21B 48/02
(52) U.S. Cl. ..................................... 166/280.2; 166/281
(58) Field of Search ........................ 166/280.1, 280.2, 166/281, 295, 308.1, 308.5

(56) References Cited

U.S. PATENT DOCUMENTS

| | | | |
|---|---|---|---|
| 4,042,032 A | 8/1977 | Anderson et al. ............ 166/276 |
| 4,070,865 A | 1/1978 | McLaughlin ................. 61/36 C |
| 4,074,760 A | 2/1978 | Copeland et al. ............ 166/276 |
| 4,336,842 A | 6/1982 | Graham et al. .............. 166/276 |
| 4,439,489 A | 3/1984 | Johnson et al. .............. 428/404 |
| 4,443,347 A | 4/1984 | Underdown et al. ... 252/8.55 R |
| 4,494,605 A | 1/1985 | Wiechel et al. .............. 166/288 |
| 4,501,328 A | 2/1985 | Nichols ....................... 166/288 |
| 4,527,627 A | 7/1985 | Graham et al. .............. 166/280 |
| 4,541,489 A | 9/1985 | Wu .............................. 166/312 |
| 4,546,012 A | 10/1985 | Brooks ........................ 427/213 |
| 4,553,596 A | 11/1985 | Graham et al. .............. 166/295 |
| 4,564,459 A | 1/1986 | Underdown et al. ... 252/8.55 R |
| 4,649,998 A | 3/1987 | Friedman .................... 166/294 |
| 4,664,819 A | 5/1987 | Glaze et al. ................. 252/8.551 |
| 4,665,988 A | 5/1987 | Murphey et al. ............ 166/295 |
| 4,669,543 A | 6/1987 | Young ......................... 166/276 |
| 4,675,140 A | 6/1987 | Sparks et al. ................ 264/4.3 |
| 4,694,905 A | 9/1987 | Armbruster ................. 166/280 |
| 4,733,729 A | 3/1988 | Copeland .................... 166/276 |
| 4,785,884 A | 11/1988 | Armbruster ................. 166/280 |
| 4,789,105 A | 12/1988 | Hosokawa et al. .......... 241/67 |
| 4,796,701 A | 1/1989 | Hudson et al. .............. 166/278 |
| 4,800,960 A | 1/1989 | Friedman et al. ........... 166/276 |
| 4,829,100 A | 5/1989 | Murphey et al. ............ 523/131 |
| 4,848,470 A | 7/1989 | Korpics ....................... 166/312 |
| 4,850,430 A | 7/1989 | Copeland et al. ........... 166/276 |
| 4,888,240 A | 12/1989 | Graham et al. .............. 428/403 |
| 4,895,207 A | 1/1990 | Friedman et al. ........... 166/276 |
| 4,903,770 A | 2/1990 | Friedman et al. ........... 166/288 |
| 4,969,522 A | 11/1990 | Whitehurst et al. ......... 166/278 |
| 4,969,523 A | 11/1990 | Martin et al. ............... 166/278 |
| 5,107,928 A | 4/1992 | Hilterhaus .................. 166/293 |
| 5,128,390 A | 7/1992 | Murphey et al. ............ 523/130 |
| 5,173,527 A | 12/1992 | Calve ........................... 524/74 |
| 5,199,491 A | 4/1993 | Kutta et al. .................. 166/276 |
| 5,199,492 A | 4/1993 | Surles et al. ................ 166/295 |
| 5,211,234 A | 5/1993 | Floyd .......................... 166/276 |
| 5,232,955 A | 8/1993 | Csabai et al. ................ 521/63 |
| 5,232,961 A | 8/1993 | Murphey et al. ............ 523/414 |
| 5,256,729 A | 10/1993 | Kutta et al. .................. 524/700 |
| 5,293,939 A | 3/1994 | Surles et al. ................ 166/295 |
| 5,330,005 A | 7/1994 | Card et al. ................... 166/280 |
| 5,332,037 A | 7/1994 | Schmidt et al. ............. 166/276 |
| 5,381,864 A | 1/1995 | Nguyen et al. .............. 166/280 |
| 5,393,810 A | 2/1995 | Harris et al. ................ 524/56 |
| 5,402,846 A | 4/1995 | Jennings, Jr. et al. ....... 166/259 |
| 5,422,183 A | 6/1995 | Sinclair et al. .............. 428/403 |
| 5,423,381 A | 6/1995 | Surles et al. ................ 166/295 |
| 5,439,055 A | 8/1995 | Card et al. ................... 166/280 |
| 5,501,275 A | 3/1996 | Card et al. ................... 166/280 |
| 5,529,123 A | 6/1996 | Carpenter et al. .......... 166/293 |

(Continued)

FOREIGN PATENT DOCUMENTS

| | | | |
|---|---|---|---|
| EP | 0313243 A2 | 4/1989 | .......... E21B/43/02 |
| EP | 0 864 726 A2 | 9/1998 | .......... E21B/43/26 |
| EP | 1326003 A1 | 7/2003 | ......... E21B/43/267 |
| EP | 1 394 355 A1 | 3/2004 | ......... E21B/43/267 |

OTHER PUBLICATIONS

Foreign Search Report and Opinion (CPW 21582 EP).
U.S. Appl. No. 10/864, 061, filed Jun. 9, 2004, Blauch, et al.
U.S. Appl. No. 10/864/618, filed Jun. 9, 2004, Blauch, et al.
S. W. Almond et al., "Factors Affecting Proppant Flowback With Resin Coated Proppants," SPE 30096 (1995 European Formation Damage Conference, May 15–16, 1995).

Primary Examiner—William Neuder
(74) Attorney, Agent, or Firm—Robert A. Kent; Baker Botts, L.L.P.

(57) ABSTRACT

Improved methods and compositions for coating proppant particles with a hardenable resin composition, suspending the coated proppant particles in a fracturing fluid, and consolidating the proppant particles after being placed in fractures into permeable masses are provided. These methods and compositions are especially suitable for low temperature well, specifically those around the 60° F. to 250° F. ranges. Preferably, a liquid hardenable resin component is mixed with a liquid hardening agent component on-the-fly to form a hardenable resin composition. The hardenable resin composition is coated onto proppant particles on-the-fly that are conveyed from a source thereof to form resin-coated proppant particles in real-time. The resin-coated proppant particles are suspended in the fracturing fluid to be utilized down hole.

19 Claims, 1 Drawing Sheet

U.S. PATENT DOCUMENTS

Figure 1:
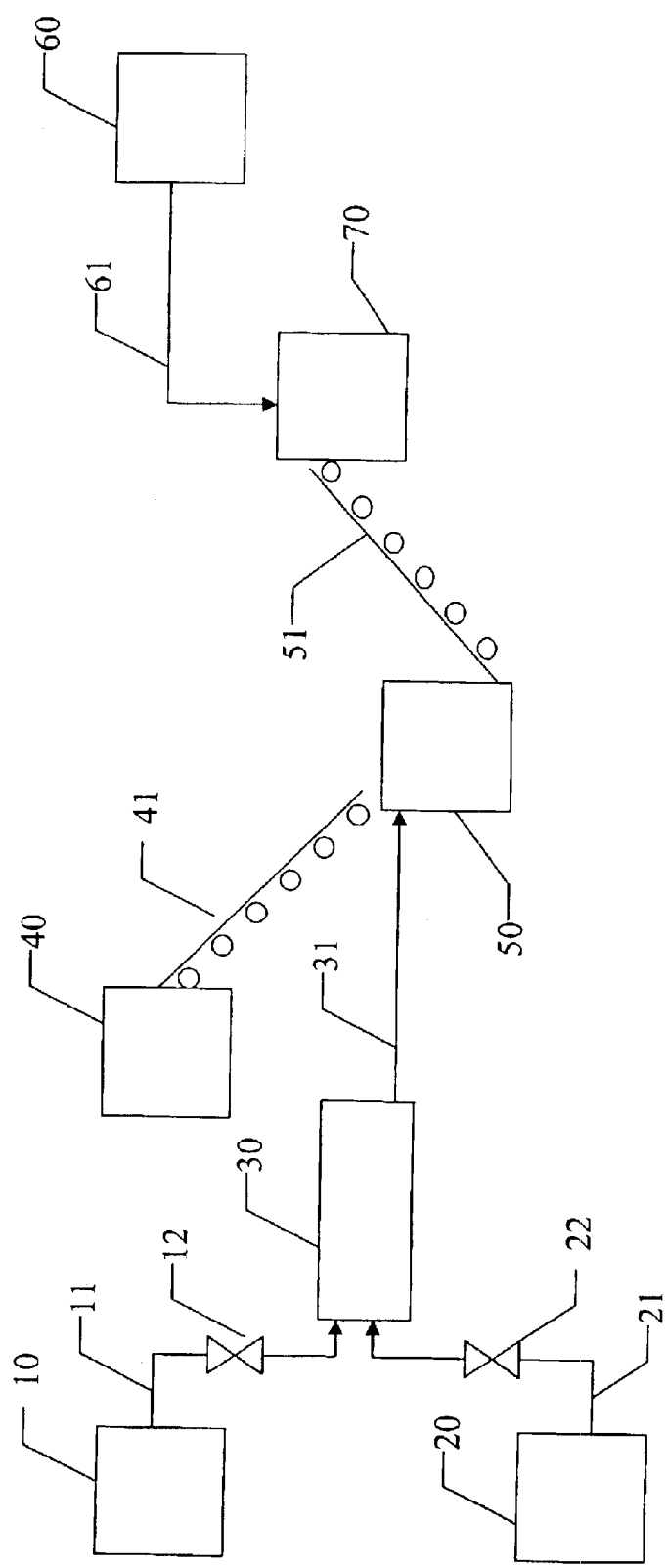

| | | | |
|---|---|---|---|
| 5,531,274 A | 7/1996 | Bienvenu, Jr. | 166/280 |
| 5,545,824 A | 8/1996 | Stengel et al. | 524/590 |
| 5,551,513 A | 9/1996 | Surles et al. | 166/278 |
| 5,551,514 A | 9/1996 | Nelson et al. | 166/280 |
| 5,582,250 A | 12/1996 | Constien | 166/280 |
| 5,597,784 A | 1/1997 | Sinclair et al. | 507/219 |
| 5,604,184 A | 2/1997 | Ellis et al. | 507/117 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,782,300 A | 7/1998 | James et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | 166/276 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,853,048 A | 12/1998 | Weaver et al. | 166/279 |
| 5,864,003 A | 1/1999 | Qureshi et al. | 528/141 |
| 5,865,936 A | 2/1999 | Edelman et al. | 156/310 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,960,880 A | 10/1999 | Nguyen et al. | 166/280 |
| 5,994,785 A | 11/1999 | Higuchi et al. | 257/789 |
| RE36,466 E | 12/1999 | Nelson et al. | 166/280 |
| 6,003,600 A | 12/1999 | Nguyen et al. | 166/281 |
| 6,016,870 A | 1/2000 | Dewprashad et al. | 166/295 |
| 6,040,398 A | 3/2000 | Kinsho et al. | 525/527 |
| 6,059,034 A | 5/2000 | Rickards et al. | 166/280 |
| 6,079,492 A | 6/2000 | Hoogteijling et al. | 166/276 |
| 6,148,911 A | 11/2000 | Gipson et al. | 166/248 |
| 6,172,011 B1 | 1/2001 | Card et al. | 507/204 |
| 6,184,311 B1 | 2/2001 | O'Keefe et al. | 525/438 |
| 6,187,834 B1 | 2/2001 | Thayer et al. | 522/15 |
| 6,238,597 B1 | 5/2001 | Yim et al. | 252/512 |
| 6,274,650 B1 | 8/2001 | Cui | 523/457 |
| 6,279,656 B1 | 8/2001 | Sinclair et al. | 166/310 |
| 6,311,773 B1 | 11/2001 | Todd et al. | 166/280 |
| 6,330,916 B1 | 12/2001 | Rickards et al. | 166/280 |
| 6,364,018 B1 | 4/2002 | Brannon et al. | 166/280 |
| 6,367,165 B1 | 4/2002 | Huttlin | 34/582 |
| 6,406,789 B1 | 6/2002 | McDaniel et al. | 428/402 |
| 6,439,309 B1 | 8/2002 | Matherly et al. | 166/276 |
| 6,440,255 B1 | 8/2002 | Kohlhammer et al. | 156/283 |
| 6,458,885 B1 | 10/2002 | Stengel et al. | 524/507 |
| 6,488,091 B1 | 12/2002 | Weaver et al. | 166/300 |
| 6,528,157 B1 | 3/2003 | Hussain et al. | 428/325 |
| 6,582,819 B2 | 6/2003 | McDaniel et al. | 428/402 |
| 6,599,863 B1 | 7/2003 | Palmer et al. | 507/219 |
| 6,608,162 B1 | 8/2003 | Chiu et al. | 528/129 |
| 6,620,857 B2 | 9/2003 | Valet | 522/42 |
| 6,626,241 B2 | 9/2003 | Nguyen | 166/278 |
| 6,632,527 B1 | 10/2003 | McDaniel et al. | 428/402 |
| 6,632,892 B2 | 10/2003 | Rubinsztajn et al. | 525/476 |
| 6,642,309 B2 | 11/2003 | Komitsu et al. | 525/100 |
| 6,659,179 B2 | 12/2003 | Nguyen | 166/308 |
| 6,664,343 B2 | 12/2003 | Narisawa et al. | 525/474 |
| 6,668,926 B2 * | 12/2003 | Nguyen et al. | 166/281 |
| 6,713,170 B1 | 3/2004 | Kaneko et al. | 428/323 |
| 6,725,931 B2 * | 4/2004 | Nguyen et al. | 166/280.2 |
| 6,729,404 B2 * | 5/2004 | Nguyen et al. | 166/280.2 |
| 6,749,025 B1 | 6/2004 | Brannon et al. | 166/305.1 |
| 2003/0131999 A1 | 7/2003 | Nguyen et al. | 166/280 |
| 2003/0148893 A1 | 8/2003 | Lunghofer et al. | 507/200 |
| 2003/0186820 A1 | 10/2003 | Thesing | 507/200 |
| 2003/0188872 A1 | 10/2003 | Nguyen et al. | 166/388 |
| 2004/0000402 A1 | 1/2004 | Nguyen et al. | 166/280 |
| 2004/0014608 A1 | 1/2004 | Nguyen et al. | 507/200 |
| 2004/0040708 A1 | 3/2004 | Stephenson et al. | 166/280.1 |

\* cited by examiner

METHODS AND COMPOSITIONS FOR CONSOLIDATING PROPPANT IN SUBTERRANEAN FRACTURES

CROSS-REFERENCE TO RELATED APPLICATIONS

This Application is a Continuation-In-Part of U.S. application Ser. No. 10/041,142 filed on Jan. 8, 2002 now U.S. Pat. No. 6,668,926 and of U.S. application Ser. No. 10/163,185 filed on Jun. 4, 2002, now abandoned, and of U.S. application Ser. No. 10/183,200 filed on Jun. 26, 2002 U.S. Pat. No. 6,729,404 and of U.S. application Ser. No. 10/260,888 filed on Sep. 30, 2002 now U.S. Pat. No. 6,725,931.

BACKGROUND OF THE INVENTION

1. Field of the Invention

The present invention relates to improved methods and compositions for consolidating proppant in subterranean fractures.

2. Description of the Prior Art

Hydrocarbon-producing wells are often stimulated by hydraulic fracturing treatments. In hydraulic fracturing treatments, a viscous fracturing fluid, which also functions as a carrier fluid, is pumped into a producing zone to be fractured at a rate and pressure such that one or more fractures are formed in the zone. Particulate solids, e.g., graded sand, for propping the fractures, commonly referred to in the art as "proppant," are suspended in a portion of the fracturing fluid so that the particulate solids are deposited in the fractures when the fracturing fluid reverts to a thin fluid to be returned to the surface. The proppant deposited in the fractures functions to prevent the fractures from fully closing so that conductive channels are formed through which produced hydrocarbons can flow.

In order to prevent the subsequent flow-back of proppant and other particulates with the produced fluids, a portion of the proppant introduced into the fractures has heretofore been coated with a hardenable resin composition that is caused to harden and consolidate the proppant particles in the fracture. Typically, the hardenable resin composition-coated proppant is deposited in the fracture after a large quantity of uncoated proppant has been deposited therein. That is, the last portion of the proppant deposited in each fracture, referred to in the art as the "tail-end" portion, is coated with the hardenable resin composition. When the fracturing fluid, which is the carrier fluid for the proppant, is broken and reverts to a thin fluid as described above, the hardenable resin-coated proppant is deposited in the fractures and the fractures close on the proppant. The partially closed fractures apply pressure on the hardenable resin-coated proppant particles whereby the particles are forced into contact with each other while the resin composition hardens. It has heretofore been thought that the hardening of the resin composition under pressure brings about the consolidation of the resin-coated proppant particles into a hard permeable mass having sufficient compressive and tensile strength to prevent unconsolidated proppant and formation sand from flowing out of the fractures with produced fluids. However, it has been found that as proppant without a hardenable resin composition coating thereon is carried into the fracture by the fracturing fluid, some of the proppant is continuously deposited in the bottom of the fracture adjacent to the wellbore. This unconsolidated accumulation of non-resin-coated proppant remains in the fracture adjacent to the wellbore and when the hardenable resin-coated proppant enters the fracture at the end of the treatment, it does not displace the uncoated proppant already deposited at the bottom of the fracture. Instead, the hardenable resin-coated proppant flows over the uncoated proppant. This results in unconsolidated proppant at the bottom of the fractures adjacent to the wellbore. During the subsequent production of formation fluids through the propped fractures, the unconsolidated proppant at the bottom of the fracture flows back with the formation fluids. The flow-back of the proppant with the formation fluids may erode metal equipment, plug piping and vessels, and cause damage to valves, instruments and other production equipment.

Another problem encountered in the use of prior hardenable resin compositions for coating proppant particles is that the hardenable resin composition components, i.e., the liquid hardenable resin component and the liquid hardening agent component, have heretofore had very short shelf lives. That is, the shelf lives of the hardenable resin composition components once batch mixed have heretofore been as short as about four hours or less. In addition, the hardenable resin composition components have heretofore had very low flash points, i.e., flash points of about 60° F. or below, making them dangerous to use. Heretofore, it has been a common practice to utilize proppant that is precoated with a resin composition and stored. When the precoated proppant is required for use at a job site, it is transported to the job site. When such precoated resin-coated proppant is consolidated after being placed by a hardening agent, the resulting consolidated proppant pack often does not have enough strength to prevent deterioration and proppant flow-back.

SUMMARY OF THE INVENTION

The present invention provides improved methods of coating proppant particles with a resin composition and suspending the coated proppant particles in a fracturing fluid, as well as improved hardenable resin compositions and components thereof. The resin compositions of this invention harden and thereby consolidate resin-coated proppant particles into permeable packs in fractures formed in subterranean zones that substantially prevent proppant flow-back.

One embodiment of the methods of the present invention comprises the following steps: providing a liquid hardenable resin component, a liquid hardening agent component, proppant particles and a liquid fracturing fluid; mixing the liquid hardenable resin component with the liquid hardening agent component to form a liquid hardenable resin composition; coating proppant particles with that liquid hardenable resin composition; suspending the hardenable resin-coated proppant particles in the liquid fracturing fluid to form a suspension; and introducing the suspension to a subterranean zone. When desired, the mixing may be terminated. Also, the pumping of the suspension into the subterranean fracture may be terminated when desired. Once introduced into the fracture, the hardenable resin on the hardenable resin-coated proppant particles is allowed to harden and consolidate into one or more permeable packs inside the subterranean fracture.

Another improved method of the present invention, which may be described as on-the-fly mixing, comprises the following steps: providing a liquid hardenable resin component a liquid hardening agent component and proppant particles; continuously mixing the liquid hardenable resin component and the liquid hardening agent component to form a hardenable resin composition; and mixing the hardenable resin composition with the proppant particles on-the-fly to form hardenable resin-coated proppant particles.

The compositions of the present invention are comprised of a hardenable resin, a hardening agent, a silane coupling agent, and a surfactant. Optionally, a hydrolyzable ester may be used, inter alia, to break any gelled fracturing fluid films on the proppant particles. Additionally, a liquid carrier fluid may be used if desired, inter alia, to affect the viscosity of the composition.

The objects, features and advantages of the present invention will be readily apparent to those skilled in the art upon a reading of the description of preferred embodiments that follows.

DESCRIPTION OF PREFERRED EMBODIMENTS

In accordance with the methods of the present invention, all or part of the proppant transported into the fractures is coated with a resin composition (preferably on-the-fly) and is suspended in the fracturing fluid as the fracturing fluid is pumped into the subterranean formation. As a result, the resin coating on the proppant is fresh and when it hardens and consolidates the proppant, permeable proppant packs are formed in the fractures that, inter alia, prevent proppant flow-back. The permeable proppant packs are generally high-strength. In addition, the hardenable resin composition components of this invention have long shelf lives, e.g., three months and longer. The components, i.e., the liquid hardenable resin component and the liquid hardening agent component, are stored separately until they are mixed in a desired weight ratio of about 1 part liquid hardenable resin component to about 1 part liquid hardening agent component just prior to being coated onto proppant. One skilled in the art with the benefit of this disclosure will recognize that this ratio can vary to suit the application at issue, e.g., about 2 parts liquid hardenable resin component to about 1 part liquid hardening agent component or more. The mixing of the components can be by batch mixing or the two components can be mixed on-the-fly to obtain a homogeneous mixture before being coated on proppant particles. The amount of mixed liquid hardenable resin composition-coated on the proppant ranges from about 0.1% to about 5% by weight of the proppant, with about 3% being preferred.

In order to conserve the amount of hardening agent utilized for curing the hardenable resin, the volume ratio of liquid hardening agent component to liquid hardenable resin component relative to the proppant utilized in accordance with this invention can be varied. In a preferred technique, the volume ratio of the liquid hardening agent component to the liquid hardenable resin component is varied from an initial volume ratio at the beginning of the proppant suspended in the fracturing fluid to a lower volume ratio as the middle portion of the proppant is suspended in the fracturing fluid, and then back to a higher volume ratio at the end portion of the proppant suspended in the fracturing fluid. This technique results in consolidated proppant packs in the fractures that have high-strength at the forward ends of the packs, less strength at the middle portions of the packs, and high-strength at the end portions of the packs. The middle portions of the packs tend to be placed deeply in the fractures far away from the wellbore. Since all of the proppant is consolidated, proppant flow-back is minimized.

When it is desirable or necessary to conserve a major portion of the hardenable resin composition, the hardenable resin composition can be applied to an initial portion of the proppant particles, not applied or intermittently applied to the middle portion of the proppant particles, and applied to the last portion of the proppant particles deposited in the fractures. One of ordinary skill in the art, with the benefit of this disclosure, will recognize the appropriate combination to achieve the desired conservation goals and permeability goals In accordance with one improved method of this invention, proppant particles are coated with the hardenable resin composition, preferably on-the-fly, the coated proppant particles are suspended in the fracturing fluid, preferably on-the-fly, and the resulting hardenable resin composition-coated proppant particles are placed in one or more fractures formed in a subterranean zone and then allowed to harden and consolidate into one or more high-strength permeable packs. The term "on-the-fly" is used herein to mean that a flowing stream is continuously introduced into another flowing stream so that the streams are combined and mixed while continuing to flow as a single stream as part of the on-going treatment. Forming the hardenable resin composition, coating the proppant particles with the hardenable resin composition, and mixing the hardenable resin-coated proppant particles with the fracturing fluid are all preferably performed on-the-fly. Such mixing can also be described as "real-time" mixing. As is well understood by those skilled in the art such mixing may also be accomplished by batch or partial batch mixing. One benefit of on-the-fly mixing over batch or partial batch mixing, however, involves reducing waste of the liquid hardenable resin component and liquid hardening agent component. Once the liquid hardenable resin component and liquid hardening agent component are mixed, the mixture must be used quickly or the resin will cure and the mixture will no longer be useable. Thus, if the components are mixed and then circumstances dictate that the well operation be stopped or postponed, the mixed components may quickly become unusable. By having the ability to rapidly shut down the mixing of the hardenable resin composition components on-the-fly, this unnecessary waste can be avoided, resulting in, inter alia, increased efficiency and cost savings.

FIG. 1 illustrates one embodiment of an on-the-fly mixing method of the present invention. In FIG. 1, container 10 holds a liquid hardenable resin component while container 20 holds a liquid hardening agent component. The liquid materials in containers 10 and 20 are transported to a mixer 30 through lines 11 and 21, respectively. Control of the total and relative amounts of resin component and hardening agent component is achieved through the use of valve 12 on resin component line 11, and valve 22 on hardening agent component line 21. In a preferred embodiment, valves 12 and 22 are computer-controlled to ensure accurate metering corresponding to the concentration of proppant and pumping rate of proppant slurry and to allow for a rapid shutdown of on-the-fly mixing when necessary. Mixer 30 mixes the resin component and hardening agent component into a single hardenable resin composition that is then transported through line 31 to be injected to the bottom of conveyance means 51 which is partially located inside the sand hopper 50. Mixer 30 can be any means known in the art for mixing two liquid streams, in one embodiment, mixer 30 may be a static mixer. Conveyance means 51 can be any means known in the art for conveying particulate material, in one embodiment, conveyance means 51 may be a sand screw. Also transported to the sand hopper 50 is a proppant material from container 40. The proppant from container 40 may be transported to sand hopper 50 by any suitable means known in the art. In one embodiment, the proppant is removed from container 40 via conveyor belt 41, after which it enters sand hopper 50. Inside the conveyance means 51, the hardenable resin composition is coated onto the proppant to form hardenable resin-coated proppant particles. Where conveyance means 51 is a sand screw, the hardenable resin composition is coated onto the proppant by the auger action of the sand screw itself. The hardenable resin-coated proppant particles are transported by the sand screw to blender tub 70. The hardenable resin-coated proppant particles from sand hopper 50 may be transported to blender tub 70 by any means known in the art. In a preferred embodiment, the transport of hardenable resin-coated proppant particles from sand hopper 50 to blender tub 70 is computer-controlled to ensure accurate metering and to allow for a rapid shutdown of on-the-fly mixing when necessary. Also transported to blender tub 70 is a fracturing fluid from container 60. The fracturing fluid from container 60 may be transported to blender tub 70 by any means known in the art. In a preferred embodiment, the transport of fracturing fluid from container 60 to blender tub 70 is computer-controlled to ensure accurate metering and to allow for a rapid shutdown of on-the-fly mixing when necessary. Inside blender tub 70, the fracturing fluid is substantially mixed with hardenable resin-coated proppant particles to form a blended composition suitable for use in subterranean fractures in the present invention. In a preferred embodiment of the method of the present invention, the on-the-fly mixing of some or all of the above mixtures occurs during the fracturing operation. Thus, as the fractures are formed by the fracturing fluid, the liquid hardenable resin component is mixed on-the-fly with the liquid hardening agent component to form the hardenable resin composition, which is then mixed on-the-fly with proppant, which is then mixed on-the-fly with fracturing fluid. In this preferred method, the components are carried into the fractures as they are being formed and when the pumping of the fracturing fluid is complete, all related on-the-fly mixing may also terminate.

The liquid hardenable resin component of the present invention is comprised of a hardenable resin and, optionally, a solvent. In preferred embodiments, the solvent utilized has a high flash point, most preferably above about 125° F. When used, the solvent is added to the resin to reduce its viscosity for ease of handling, mixing, and transferring. It is within the ability of one skilled in the art, with the benefit of this disclosure, to determine if and how much of a solvent is needed to achieve a suitable viscosity. Optionally, the liquid hardenable resin can be heated to reduce its viscosity rather than using a solvent.

The liquid hardening agent component of the present invention is comprised of a hardening agent; a silane coupling agent; an optional hydrolyzable ester for, inter alia, breaking gelled fracturing fluid films on the proppant particles; a surfactant for, inter alia, facilitating the coating of the resin on the proppant particles and for causing the hardenable resin to flow to the contact points between adjacent resin-coated proppant particles; and an optional liquid carrier fluid preferably having a high flash point (above about 125° F.). When used, the liquid carrier fluid is added to the liquid hardening agent component, inter alia, to reduce its viscosity for ease of handling, mixing and transferring. It is within the ability of one skilled in the art to determine if and how much liquid carrier fluid is needed to achieve a suitable viscosity.

In addition to the liquid hardenable resin component and the liquid hardening agent component, proppant particles and a liquid fracturing fluid are also used in the present invention. In one embodiment of a method of the present invention, a liquid hardenable resin component is mixed with a liquid hardening agent component to form a hardenable resin composition. The hardenable resin composition is then coated onto proppant particles to form hardenable resin-coated proppant particles that are subsequently mixed with a fracturing fluid. The liquid fracturing fluid containing hardenable resin-coated proppant particles is then introduced into a subterranean zone having one or more fractures therein while placing the hardenable resin-coated proppant particles in the fractures. The hardenable resin-coated proppant particles are then allowed to harden and consolidate into one or more high-strength permeable packs that prevent proppant flow-back. As is well understood by those skilled in the art, the liquid fracturing fluid can include additional components, including, but not limited to, a breaker, which causes it to revert to a thin fluid so that the resin composition-coated proppant particles are tightly packed in the fractures and the fracturing fluid is returned to the surface during flow back or cleanup stage.

As is also well understood, when the fracturing fluid is broken and the hardenable resin composition-coated proppant particles are deposited in the fractures, the fractures substantially close on the proppant particles. Thus, pressure is applied on the hardenable resin composition-coated proppant whereby the proppant particles are forced into contact with each other while the resin composition hardens. The hardening of the resin composition under pressure helps bring about the consolidation of the resin-coated particles into a hard permeable pack having sufficient compressive strength to aid in preventing particulate flow-back. In fracture treatments carried out in unconsolidated formations, good consolidation of proppant is required in the perforations, which extend from the inside of the wellbore through casing and cement into the unconsolidated formation, as well as in the fractured portions of the unconsolidated formation surrounding the wellbore. At least the last portion of the proppant deposited in the perforations and in the fractures is coated with a hardenable resin composition and is caused to harden. The resulting consolidated proppant in the perforations and fractures contributes to the prevention of proppant flow-back. However, there is often little closure pressure applied to the hardenable resin-coated proppant in the fractures close to the wellbore, and there is no closure pressure applied to the hardenable resin-coated proppant particles in the perforations. In addition, the hardenable resin-coated proppant particles can be separated from each other by films of the fracturing fluid and, because of the presence of such fracturing fluid films, the proppant particles may not sufficiently consolidate. As a result, the consolidated permeable packs formed in the perforations and fractures often have less-than-sufficient compressive strength to prevent particulate flow-back problems. These problems may be addressed by including in the hardenable resin composition one or more hydrolyzable esters, which function, inter alia, to break fracturing fluid films on the particles, and a surfactant for, inter alia, facilitating the coating of the resin composition on the proppant particles and for causing the hardenable resin composition to flow to the contact points between adjacent resin-coated proppant particles so that the particles are consolidated into a high-strength permeable mass.

In accordance with the above-described methods, preferably all of the proppant particles are coated with the liquid hardenable resin composition on an on-the-fly basis. In order to conserve the liquid hardening agent component used and to reduce the cost of the fracturing procedure, the volume ratio of the liquid hardening agent component may be varied. That is, in a most-preferred technique, the volume ratio of the liquid hardening agent component to the liquid hardenable resin component may be varied from an initial volume ratio that produces a high-strength permeable pack to a lower volume ratio that produces a lower-strength resilient permeable pack, and then back to a higher initial volume ratio that produces a high-strength permeable pack adjacent to the wellbore. The initial volume ratio of the liquid hardening agent component to the liquid hardenable resin component is generally in the range of from about 1:10 to about 1:1, and the lower volume ratio is in the range of from about 1:20 to about 1:5. If such a method is used, preferably, the initial volume ratio of the liquid hardening agent component to the liquid hardenable resin component is about 1:1 and the lower volume ratio is about 1:5.

Another embodiment of a method of the present invention includes the following steps. A liquid hardenable resin component, a liquid hardening agent component, proppant particles and liquid fracturing fluid are provided. The liquid fracturing fluid is pumped into the subterranean zone to form at least one fracture therein. As the fracture is formed, at the surface the liquid hardenable resin component is mixed with the liquid hardening agent component, preferably on-the-fly, to form the hardenable resin composition. During the fracturing process, the volume ratio of the liquid hardening agent component to the liquid hardenable resin component is varied, and the hardenable resin composition formed is continuously coated onto proppant particles conveyed from the source thereof, preferably on-the-fly, to form hardenable resin composition-coated proppant particles. The hardenable resin composition-coated proppant particles are continuously mixed with the fracturing fluid, preferably on-the-fly, such that the hardenable resin composition-coated proppant particles are suspended on an as-needed basis for introduction into the subterranean formation. After the hardenable resin composition-coated proppant particles have been placed in the one or more fractures formed in the subterranean zone, the pumping of the liquid fracturing fluid and other related steps may be terminated. Thereafter, the liquid fracturing fluid breaks into a thin fluid, the hardenable resin composition-coated proppant particles are deposited in the fractures, and the resin composition hardens and consolidates the proppant particles in the one or more fractures into high-strength permeable packs.

Yet another embodiment of the methods of the present invention comprises the following steps. A liquid hardenable resin component, a liquid hardening agent component, proppant particles, and liquid fracturing fluid are provided. The liquid fracturing fluid is pumped into the subterranean zone to form one or more fractures therein. As the fractures are formed, the liquid hardenable resin component is mixed with the liquid hardening agent component, preferably on-the-fly, to form the hardenable resin composition. The hardenable resin composition formed is intermittently coated onto proppant particles conveyed from the source thereof, preferably on-the-fly, to intermittently form hardenable resin composition-coated proppant particles and uncoated proppant particles. The hardenable resin composition-coated proppant particles and uncoated proppant particles are mixed with the fracturing fluid being pumped, preferably on-the-fly, whereby the hardenable resin composition-coated proppant particles and uncoated proppant particles are substantially suspended therein. After the hardenable resin composition-coated proppant particles and uncoated proppant particles have been placed in the one or more fractures formed in the subterranean zone, the pumping of the liquid fracturing fluid and other related steps are terminated. Thereafter, the liquid fracturing fluid breaks into a thin fluid, the hardenable resin composition-coated proppant particles and the uncoated particles are deposited in the fractures and the resin composition hardens and consolidates the proppant particles in the one or more fractures into high-strength permeable packs.

In a preferred embodiment of an intermittent method suitable for when the wellbore includes a single perforated interval having a length of less than about 50 feet or several perforated intervals having a combined length of less than about 50 feet, the hardenable resin composition-coated proppant particles are suspended in the fracturing fluid. During the initial time period of pumping the fracturing fluid, uncoated proppant particles are suspended in the fracturing fluid during the middle time period of pumping the fracturing fluid, and hardenable resin composition-coated proppant particles are suspended in the fracturing fluid during the last time period of pumping the fracturing fluid. This method results in hardenable resin composition-coated proppant particles entering the fractures first and depositing hardenable resin composition-coated proppant in the bottom of the fractures and additional hardenable resin composition-coated particles entering the fractures last, which moves uncoated proppant particles to the middle of the fractures and prevents uncoated proppant particles from flowing back with produced fluids.

Most preferably, the resin composition-coated proppant particles suspended in the fracturing fluid pumped during the initial time period constitute about 15% of the total proppant particles pumped, the uncoated proppant particles suspended in the fracturing fluid pumped during the middle time period constitute about 60% of the total proppant particles pumped and the resin composition-coated proppant particles suspended in the fracturing fluid pumped during the last time period constitute about 25% of the total proppant particles pumped.

When the wellbore includes multiple perforated intervals having a length greater than about 50 feet, preferably hardenable resin composition-coated proppant particles are suspended in the fracturing fluid during the initial time period of pumping the fracturing fluid, a mixture of resin composition-coated proppant particles and uncoated proppant particles are suspended in the fracturing fluid during the middle time period of pumping the fracturing fluid and hardenable resin-coated proppant particles are suspended in the fracturing fluid during the last time period of pumping the fracturing fluid.

Most preferably, the resin composition-coated proppant particles suspended in the fracturing fluid pumped during the initial time period constitute about 15% of the total proppant particles pumped, the mixture of the resin composition-coated proppant particles and the uncoated proppant particles pumped during the middle time period constitute about 60% of the total proppant particles and the resin composition-coated proppant particles suspended in the fracturing fluid pumped during the last time period constitute about 25% of the total proppant particles pumped.

Examples of preferred hardenable resins that can be utilized in the liquid hardenable resin component include, but are not limited to, resins such as bisphenol A-epichlorohydrin resin, polyepoxide resin, novolak resin, polyester resin, phenol-aldehyde resin, urea-aldehyde resin, furan resin, urethane resin, glycidyl ethers and mixtures thereof. Of these, bisphenol A-epichlorohydrin resin is preferred. The resin utilized is included in the liquid hardenable resin component in an amount in the range of from about 70% to about 100% by weight of the liquid hardenable resin component, preferably in an amount of about 85%.

Any solvent that is compatible with the hardenable resin and achieves the desired viscosity effect is suitable for use in the present invention. Preferred solvents are those having high flash points (most preferably about 125° F.). As described above, use of a solvent in the hardenable resin composition is optional but may be desirable to reduce the viscosity of the hardenable resin component for ease of handling, mixing, and transferring. It is within the ability of one skilled in the art with the benefit of this disclosure to determine if and how much solvent is needed to achieve a suitable viscosity. Solvents suitable for use in the present invention include, but are not limited to, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, butylglucidyl ether is the preferred optional solvent. The amount of the solvent utilized in the liquid hardenable resin component is in the range of from about 0% to about 30% by weight of the liquid hardenable resin component, preferably in an amount of about 15%.

Examples of preferred hardening agents that can be used in the liquid hardening agent component include, but are not limited to, amines, aromatic amines, polyamines, aliphatic amines, cyclo-aliphatic amines, amides, polyamides, 2-ethyl-4-methyl imidazole and 1,1,3-trichlorotrifluoroacetone. Selection of a preferred hardening agent is dependent, in part, on the temperature of the formation in which the hardening agent will be used. By way of example, and not of limitation, in subterranean formations having a temperature from about 60° F. to about 250 $20$ F., amines and cyclo-aliphatic amines such as piperidine, triethylamine, N,N-dimethylaminopyridine, benzyldimethylamine, tris(dimethylaminomethyl) phenol, and 2-($N_2$N-dimethylaminomethyl)phenol are preferred. In subterranean formations having higher temperatures, 4,4'-diaminodiphenyl sulfone may be a suitable hardening agent. The hardening agent is included in the liquid hardening agent component in an amount in the range of from about 40% to about 60% by weight of the liquid hardening agent component, preferably in an amount of about 50%.

Any silane coupling agent that is compatible with the hardening agent and facilitates the coupling of the resin to the surface of the formation sand particles is suitable for use in the present invention. Examples of preferred silane coupling agents suitable for the liquid hardening agent component include, but are not limited to, N-2-(aminoethyl)-3-aminopropyltrimethoxysilane, 3-glycidoxypropyltrimethoxysilane, and n-beta-(aminoethyl)-gamma-aminopropyl trimethoxysilane. Of these, n-beta-(aminoethyl)-gamma-aminopropyl trimethoxysilane is preferred. The silane coupling agent is included in the liquid hardening agent component in an amount in the range of from about 0.1% to about 3% by weight of the liquid hardening agent component.

Any hydrolyzable ester that is compatible with the hardening agent and facilitates the coating of the resin composition onto the proppant particles and breaks fracturing fluid films is suitable for use in the present invention. Examples of preferred hydrolyzable esters that can be utilized in the liquid hardening agent component of the two-component consolidation fluids of the present invention for, inter alia, facilitating the coating of the resin composition on the proppant particles and breaking fracturing fluid films thereon include, but are not limited to, a mixture of dimethylglutarate, dimethyladipate and dimethylsuccinate, sorbitol, catechol, dimethylthiolate, methyl salicylate, dimethyl salicylate, dimethylsuccinate, and ter-butylhydroperoxide. Of these, a mixture of dimethylglutarate, dimethyladipate and dimethylsuccinate is preferred. The ester or esters are present in the liquid hardening agent component in an amount in the range of from about 0% to about 3% by weight of the liquid hardening agent component, preferably in an amount of about 2%.

Any surfactant compatible with the liquid hardening agent and capable of facilitating the coating of the resin on the proppant particles and causing the hardenable resin to flow to the contact points between adjacent resin-coated proppant particles may be used in the present invention. Such preferred surfactants include, but are not limited to, an ethoxylated nonyl phenol phosphate ester, mixtures of one or more cationic surfactants, and one or more non-ionic surfactants, and an alkyl phosphonate surfactant. Suitable mixtures of one or more cationic and nonionic surfactants are described in U.S. Pat. No. 6,311,733 issued to Todd et al. on Nov. 6, 2001, the disclosure of which is incorporated herein by reference. A $C_{12}$–$C_{22}$ alkyl phosphonate surfactant is preferred. The surfactant or surfactants utilized are included in the liquid hardening agent component in an amount in the range of from about 2% to about 15% by weight of the liquid hardening agent component, preferably in an amount of about 12%.

Use of a liquid carrier fluid in the hardenable resin composition is optional and may be used to reduce the viscosity of the hardenable resin component for ease of handling, mixing and transferring. It is within the ability of one skilled in the art, with the benefit of this disclosure, to determine if and how much liquid carrier fluid is needed to achieve a viscosity suitable to the subterranean conditions. Any suitable carrier fluid that is compatible with the hardenable resin and achieves the desired viscosity effects is suitable for use in the present invention. Preferred liquid carrier fluids that can be utilized in the liquid hardening agent component of the two-component consolidation fluids of the present invention preferably include those having high flash points (most preferably above about 125° F.). Examples of liquid carrier fluids suitable for use in the present invention include, but are not limited to, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene and fatty acid methyl esters. Of these, dipropylene glycol methyl ether is preferred. The liquid carrier fluid is present in the liquid hardening agent component in an amount in the range of from about 0% to about 40% by weight of the liquid hardening agent component, preferably in an amount of about 30%.

As mentioned above, during the time that the liquid hardenable resin component and the liquid hardening agent component are mixed and coated on the proppant particles, the rate of the liquid hardening agent component can be varied while the rate of the liquid hardenable resin component is held constant. Stated another way, in addition to varying whether or not the proppant particles are coated at all, the volume ratio of the liquid hardening agent component to the liquid hardenable resin component on those particles that are coated may be varied as well. Preferably, the volume ratio of the liquid hardening agent component to the liquid hardenable resin component may be varied from an initial volume ratio to a lower volume ratio and then back to the initial volume ratio. One of ordinary skill in the art, with the benefit of this disclosure, will be able to determine the suitable ratio of components to meet the desired goals.

Any fracturing fluid suitable for a fracturing application may be utilized in accordance with the present invention, including aqueous gels, emulsions, and other suitable fracturing fluids. The aqueous gels are generally comprised of water and one or more gelling agents. The emulsions can be comprised of two immiscible liquids such as an aqueous gelled liquid and a liquefied, normally gaseous fluid, such as nitrogen.

The preferred fracturing fluids for use in accordance with this invention are aqueous gels comprised of water, a gelling agent for gelling the water and increasing its viscosity, and optionally, a cross-linking agent for cross-linking the gel and further increasing the viscosity of the fluid. The increased viscosity of the gelled or gelled and cross-linked fracturing fluid, inter alia, reduces fluid loss and allows the fracturing fluid to transport significant quantities of suspended proppant particles. The water utilized to form the fracturing fluid can be salt water, brine, or any other aqueous liquid that does not adversely react with the other components.

A variety of gelling agents can be utilized, including hydratable polymers that contain one or more functional groups such as hydroxyl, cis-hydroxyl, carboxyl, sulfate, sulfonate, amino or amide. Particularly useful are polysaccharides and derivatives thereof that contain one or more of the monosaccharide units galactose, mannose, glucoside, glucose, xylose, arabinose, fructose, glucuronic acid or pyranosyl sulfate. Examples of natural hydratable polymers containing the foregoing functional groups and units that are particularly useful in accordance with the present invention include guar gum and derivatives thereof such as hydroxypropyl guar and cellulose derivatives, such as hydroxyethyl cellulose. Hydratable synthetic polymers and copolymers that contain the above-mentioned functional groups can also be utilized. Examples of such synthetic polymers include, but are not limited to, polyacrylate, polymethacrylate, polyacrylamide, polyvinyl alcohol and polyvinylpyrrolidone. The gelling agent used is generally combined with the water in the fracturing fluid in an amount in the range of from about 0.01% to about 2% by weight of the water.

Examples of cross-linking agents that can be utilized to further increase the viscosity of a gelled fracturing fluid are alkali metal borates, borax, boric acid, and compounds that are capable of releasing multivalent metal ions in aqueous solutions. Examples of the multivalent metal ions are chromium, zirconium, antimony, titanium, iron, zinc or aluminum. When used, the cross-linking agent is generally added to the gelled water in an amount in the range of from about 0.01% to about 5% by weight of the water.

The above-described gelled or gelled and cross-linked fracturing fluids typically also include internal delayed gel breakers such as those of the enzyme type, the oxidizing type, the acid buffer type, or the temperature-activated type. The gel breakers cause the viscous carrier fluids, inter alia, to revert to thin fluids that can be produced back to the surface after they have been used to place proppant particles in subterranean fractures. The gel breaker used is generally present in the fracturing fluid in an amount in the range of from about 1% to about 5% by weight of the gelling agent therein. The fracturing fluids can also include one or more of a variety of well known additives such as gel stabilizers, fluid loss control additives, clay stabilizers, bacteriacides, and the like.

The proppant particles utilized in accordance with the present invention are generally of a size such that formation particulate solids, which migrate with produced fluids, are prevented from being produced from the subterranean zone. Any suitable proppant may be utilized, including graded sand, bauxite, ceramic materials, glass materials, walnut hulls, polymer beads and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

To further illustrate some embodiments of the present invention, the following examples are given. In no way should such examples be read to limit the scope of the invention.

EXAMPLES

Example 1

A liquid hardenable resin component of this invention was prepared by mixing a bisphenol A-epichlorohydrin resin with a butylglycidyl ether solvent. The bisphenol A-epichlorohydrin resin was present in the resulting liquid hardenable resin component in an amount of about 85% by weight of the liquid hardenable resin component, and the solvent was present in the liquid hardenable resin component in an amount of about 15% by weight of the liquid hardenable resin component.

A liquid hardening agent component was prepared by combining the following chemicals: a cycloaliphatic amine hardening agent in an amount of about 50% by weight of the liquid hardening agent component; a n-beta(aminoethyl)-gamma-aminopropyl trimethoxysilane silane coupling agent in an amount of about 4% by weight of the liquid agent component; a $C_{12}$–$C_{22}$ alkyl phosphonate surfactant in an amount of about 9% by weight of the liquid hardening agent component; and a dipropylene glycol methyl ether or dipropylene glycol dimethyl ether liquid carrier fluid in an amount of about 37% by weight of the liquid hardening agent component.

The liquid hardenable resin and liquid hardening agent component were at room temperature and their viscosities were monitored over time. Table 1 shows in viscosity over time:

TABLE 1

| | Viscosity (cp) as a Function of Time | |
|---|---|---|
| Number of Days | Viscosity (cp) of liquid hardenable resin component | Viscosity (cp) of liquid hardening agent component |
| 0 | 307 | 384 |
| 6 | 307 | 448 |
| 30 | 384 | 474 |
| 60 | 410 | 474 |
| 205 | 467 | 474 |

From Table 1, it is evident that the viscosity of the components remained within acceptable levels over a long period of time.

Example 2

Consolidation strength testing was performed for various proppant types, sizes and carrier fluids. A resin mixture comprised of the liquid hardenable resin component and the liquid hardening agent component described in Example 1. A mixture of 4.6 mL of liquid hardenable resin component and 5.4 mL of liquid hardening agent component was prepared by blending these two components together to form a homogeneous mixture. A volume of 7.8 mL of this resin mixture was added and coated directly onto 250 grams of 20/40-mesh bauxite proppant. The resin-coated proppant was then mixed with a cross-linking water-based gel fracturing fluid. The resultant mixture was stirred for one hour at 125° F. to simulate the effect of pumping and fluid suspension that occurs during a subterranean fracturing treatment. The mixture was then packed into brass flow cells without applying any closure stress and cured in an oven at the temperatures and cure times shown in Tables 2–8, below. Consolidated cores were obtained from the proppant packs to determine the unconfined compressive strength (UCS) in psi.

TABLE 2

UCS (psi) obtained for hardenable resin-treated proppant in a crosslinked water-based fracturing fluid and cured for 6 hours

| Proppant | Cure Temperature | UCS (psi) |
|---|---|---|
| 16/20 bauxite - US ore | 140° F. | 153.3 |
| 16/20 bauxite - US ore | 165° F. | 196 |
| 16/20 bauxite - US ore | 190° F. | 101.8 |
| 20/40 bauxite - Russian ore | 140° F. | 258.1 |
| 16/30 bauxite - Russian ore | 140° F. | 143 |
| 16/20 bauxite - Russian ore | 140° F. | 206.9 |

TABLE 3

UCS (psi) obtained for hardenable resin-treated proppant in a crosslinked water-based fracturing fluid and cured for 16 hours

| Proppant | Cure Temperature | UCS (psi) |
|---|---|---|
| 16/20 bauxite - US ore | 170° F. | 244.7 |
| 20/40 bauxite - US ore | 165° F. | 133.5 |
| 20/40 bauxite - Russian ore | 140° F. | 289.9 |

TABLE 4

UCS (psi) obtained for hardenable resin-treated proppant in a crosslinked water-based fracturing fluid and cured for 24 hours

| Proppant | Cure Temperature | UCS (psi) |
|---|---|---|
| 16/20 bauxite - US ore | 140° F. | 193.3 |
| 16/20 bauxite - US ore | 140° F. | 267.7 |
| 16/20 bauxite - US ore | 165° F. | 270.9 |
| 16/20 bauxite - US ore | 190° F. | 197.5 |
| 20/40 bauxite - Russian ore | 140° F. | 297.7 |
| 16/30 bauxite - Russian ore | 140° F. | 244.7 |
| 16/20 bauxite - Russian ore | 140° F. | 287.4 |
| 16/30 bauxite - Russian ore | 140° F. | 401 |

TABLE 5

UCS (psi) obtained for hardenable resin-treated proppant in a crosslinked water-based fracturing fluid and cured for 48 hours

| Proppant | Cure Temperature | UCS (psi) |
|---|---|---|
| 16/20 bauxite - US ore | 140° F. | 290.8 |
| 16/20 bauxite - US ore | 140° F. | 356.5 |
| 16/20 bauxite - US ore | 165° F. | 280.2 |
| 16/20 bauxite - US ore | 190° F. | 187.9 |
| 20/40 bauxite - Russian ore | 140° F. | 565.9 |
| 16/30 bauxite - Russian ore | 140° F. | 236.1 |
| 16/20 bauxite - Russian ore | 140° F. | 390.4 |
| 16/30 bauxite - Russian ore | 140° F. | 477.1 |

TABLE 6

UCS (psi) as calculated for hardenable resin-treated proppant in a crosslinked water-based fracturing fluid and cured for 24 hours

| Proppant | Cure Temperature | UCS (psi) |
|---|---|---|
| 16/20 bauxite - US ore | 140° F. | 610.5 |
| 20/40 bauxite - Russian ore | 165° F. | 579.8 |
| 16/20 bauxite - Russian ore | 165° F. | 452.9 |
| 20/40 bauxite - Russian ore | 165° F. | 579.8 |
| 16/20 bauxite - Russian ore | 165° F. | 452.9 |
| 16/20 bauxite - US ore | 165° F. | 433.3 |
| 16/20 bauxite - US ore | 190° F. | 586.5 |

TABLE 7

UCS (psi) as calculated for hardenable resin-treated proppant in a crosslinked water-based fracturing fluid and cured for 24 hours

| Proppant | Cure Temperature | UCS (psi) |
|---|---|---|
| 16/20 bauxite - US ore | 190° F. | 239.9 |
| 16/20 bauxite - US ore | 190° F. | 259.2 |
| 16/20 bauxite - US ore | 190° F. | 185.4 |

TABLE 8

UCS (psi) as calculated for hardenable resin-treated proppant in linear hydroxyethyl cellulose polymer fluid and cured for 24 hours

| Proppant | Cure Temperature | UCS (psi) |
|---|---|---|
| 20/40 Brady sand | 140° F. | 570.4 |
| 20/40 ceramic | 140° F. | 500.2 |
| 20/40 Brady sand | 165° F. | 733.2 |
| 20/40 ceramic | 165° F. | 368.5 |

In addition, a sample of 20/40 Brady Sand treated with hardenable resin, suspended in crosslinked water-based fracturing fluid and cured at 190° F., was also tested at 6 hours and again at 5 days, and the unconfined compressive strength was found to be 789.9 psi and 702.2 psi, respectively.

Tables 2 through 8 show that the hardenable resin-treated proppants of the present invention achieve unconfined compressive strengths.

Example 3

Resin-coated proppant as described in the present invention was created at resin concentrations of 0%, 1% and 2% by weight of the proppant using 20/40 bauxite proppant made from US ore. Proppant packs were formed at 150° F. and at various closure pressures. The conductivity of the various packs was tested, and the results are displayed in Table 9, below.

TABLE 9

Effect of Resin Concentrations on Proppant Pack Conductivity
(mD-ft) Obtained at various Closure Stresses

| Closure Stress (psi) | Resin Concentration (% volume/weight) | | |
|---|---|---|---|
| | 0 | 1 | 2 |
| 2,000 | 4382 | 5045 | 6366 |
| 4,000 | 4121 | 4903 | 5950 |
| 6,000 | 3660 | 4012 | 5216 |

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of making high-strength permeable packs in a fracture created in a subterranean zone having a temperature from about 60° F. to about 250° F. comprising the steps of:
   a providing a liquid hardenable resin component comprising a hardenable resin;
   b providing a liquid hardening agent component comprising a liquid hardening agent, a silane coupling agent, and a surfactant;
   c providing proppant particles;
   d providing a fracturing fluid;
   e mixing the liquid hardenable resin component with the liquid hardening agent component on-the-fly to form a liquid hardenable resin composition;
   f coating the proppant particles with the liquid hardenable resin composition at the well site to form hardenable resin-coated proppant particles;
   g suspending the hardenable resin-coated proppant particles in the fracturing fluid to form a substantial suspension of hardenable resin-coated proppant particles in the fracturing fluid; wherein the coating of the proppant particles occurs substantially before the suspending of the hardenable resin-coated proppant particles in the fracturing fluid;
   h pumping the suspension into a subterranean zone for a chosen period of time to form one or more fractures therein;
   i placing at least some of the hardenable resin-coated proppant particles in at least one of the fractures;
   j terminating steps e, f, g, h, and i; and,
   k allowing the hardenable resin on the hardenable resin-coated proppant particles to cure.

2. The method of claim 1 wherein the hardenable resin in the liquid hardenable resin component is an organic resin comprising bisphenol A-epichlorohydrin resin, polyepoxide resin, novolak resin, polyester resin, phenol-aldehyde resin, urea-aldehyde resin, furan resin, urethane resin, glycidyl ethers, or mixtures thereof.

3. The method of claim 1 wherein the hardenable resin in the liquid hardenable resin component further comprises a solvent.

4. The method of claim 3 wherein the solvent for the hardenable resin in the liquid hardenable resin component comprises at least one of the following: butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, or mixtures thereof.

5. The method of claim 1 wherein the liquid hardening agent in the liquid hardening agent component comprises at least one of the following: amines, aromatic amines, aliphatic amines, cyclo-aliphatic amines, piperidine, triethylamine, benzyldimethylamine, N,N-dimethylaminopyridine, 2-(N$_2$N-dimethylaminomethyl) phenol, tris(dimethylaminomethyl)phenol, or mixtures thereof.

6. The method of claim 1 wherein the silane coupling agent in the liquid hardening agent component comprises at least one of the following: N-2-(aminoethyl)-3-aminopropyltrimethoxysilane, 3-glycidoxypropyltrimethoxysilane, n-beta-(aminoethyl)-gamma-aminopropyl trimethoxysilane or mixtures thereof.

7. The method of claim 1 wherein the silane coupling agent in the liquid hardening agent component comprises n-beta-(aminoethyl)-gamma-aminopropyl trimethoxysilane.

8. The method of claim 1 wherein the liquid hardening agent further comprises a hydrolyzable ester.

9. The method of claim 8 wherein the hydrolyzable ester comprises at least one of the following: dimethylglutarate, dimethyladipate and dimethylsuccinate, sorbitol, catechol, dimethylthiolate, methyl salicylate, dimethyl salicylate, dimethylsuccinate, ter-butylhydroperoxide, or mixtures thereof.

10. The method of claim 1 wherein the surfactant in the liquid hardening agent component comprises at least one of the following: ethoxylated nonyl phenol phosphate ester, mixtures of one or more cationic surfactants, a $C_{12}$–$C_{22}$ alkyl phosphonate surfactant, a mixture of one or more non-ionic surfactants and an alkyl phosphonate surfactant, or mixtures thereof.

11. The method of claim 1 wherein the surfactant in the liquid hardening agent component comprises a $C_{12}$–$C_{22}$ alkyl phosphonate surfactant.

12. The method of claim 1 wherein the liquid hardening agent further comprises a liquid carrier fluid.

13. The method of claim 12 wherein the liquid carrier fluid comprises at least one of the following: dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters or mixtures thereof.

14. The method of claim 1 further comprising the step of varying the volume ratio of said liquid hardening agent component to said liquid hardenable resin component during step (d).

15. The method of claim 1 further comprising the step of varying the volume ratio of the liquid hardening agent component to the liquid hardenable resin component over the chosen period of time from an initial volume ratio to a lower volume ratio and then back to the initial volume ratio.

16. The method of claim 15 wherein the initial volume ratio of the liquid hardening agent component to the liquid hardenable resin component is in the range of from about 1:10 to about 1:1 and the lower volume ratio is in the range of from about 1:20 to about 1:5.

17. The method of claim 15 wherein the initial volume ratio of the liquid hardening agent component to the liquid hardenable resin component is about 1:1.5 and the lower volume ratio is about 1:5.

18. A method of on-the-fly mixing of a hardenable resin composition and a proppant comprising the steps of:

(a) providing a premixed liquid hardenable resin component;
(b) providing a premixed liquid hardening agent component;
(c) providing a source of proppant particles;
(d) continuously mixing the premixed liquid hardenable resin component and the premixed liquid hardening agent component at a desired ratio on-the-fly to form a hardenable resin composition;
(e) mixing the hardenable resin composition with the proppant particles on-the-fly to form hardenable resin-coated proppant particles; and
(f) combining at least some of the hardenable resin-coated proppant particles with a fracturing fluid to form a suspension.

19. The method of claim 18 further comprising the steps of:
(a) pumping the suspension into a subterranean zone having a temperature from about 60° F. to about 250° F. for a chosen period of time at a pressure sufficient to creat or enhance a fracture therein;
(b) terminating step (a); and,
(c) allowing the hardenable resin on the hardenable resin-coated proppant particles to harden and consolidate into one or more high-strength permeable packs inside a subterranean fracture.

* * * * *